United States Patent [19]

Escue

[11] 4,423,878

[45] Jan. 3, 1984

[54] SEALING ASSEMBLY, KIT AND METHOD FOR ROTATABLE SHAFTS

[76] Inventor: Jesse W. Escue, 1010 Buell Ave., Joliet, Ill. 60435

[21] Appl. No.: 363,375

[22] Filed: Mar. 29, 1982

[51] Int. Cl.³ ............................................. F16J 15/34
[52] U.S. Cl. ......................................... 277/1; 277/9; 277/11; 277/81 R; 277/197
[58] Field of Search ...................... 277/1, 2, 9, 9.5, 11, 277/81 R, 91, 93 R, 935 D, 126, 189, 192, 197, 199

[56] References Cited

U.S. PATENT DOCUMENTS

| 896,287 | 8/1908 | Felt | 277/44 |
|---|---|---|---|
| 1,062,438 | 5/1913 | Clark . | |
| 1,167,210 | 1/1916 | Orr | 277/93 R X |
| 2,252,526 | 8/1941 | Shenton . | |
| 2,258,190 | 10/1941 | Neilou | 277/105 |
| 2,354,478 | 7/1944 | Reinhardt et al. . | |
| 2,455,539 | 12/1948 | Wahl . | |
| 2,925,291 | 2/1960 | Bygbjerg | 277/9 X |
| 2,996,319 | 8/1961 | Copes | 277/93 R X |
| 3,072,414 | 1/1963 | Porges | 277/93 R X |
| 3,152,816 | 10/1964 | Smith | 277/9 X |
| 3,313,550 | 4/1967 | Culman | 277/4 |
| 3,391,942 | 7/1968 | Wilson | 277/93 R X |
| 3,529,839 | 9/1970 | Griener et al. | 277/91 |
| 3,589,738 | 6/1971 | Tracy | 277/74 |
| 3,961,799 | 6/1976 | Peet | 277/9 |
| 4,215,870 | 8/1980 | Escue | 277/93 R |
| 4,256,313 | 3/1981 | Arnold | 277/11 |

FOREIGN PATENT DOCUMENTS

| 489486 | 9/1930 | Fed. Rep. of Germany | 277/93 R |
|---|---|---|---|
| 1142328 | 2/1969 | United Kingdom | 277/9 |

*Primary Examiner*—Robert S. Ward, Jr.
*Attorney, Agent, or Firm*—Arnstein, Gluck & Lehr

[57] ABSTRACT

A sealing assembly, kit and method for rotatable shafts. The assembly includes a stationary seal member having an insert receiving opening dimensioned larger than a rotatable shaft, an insert member having an enlargeable shaft-receiving opening adapted to be mounted in the insert-receiving opening in the stationary seal member, and a rotatable seal member adapted to be mounted on the rotatable shaft to engage and cooperate with the insert member. The kit is similarly composed of the same elements but with a plurality of each such element having differing sizes to accommodate rotatable shafts of different dimensions. The method includes providing a stationary seal member, providing and mounting an insert member in an insert-receiving opening in the stationary seal member after which a shaft-receiving opening in the insert member is enlarged to generally conform to a rotatable shaft and the stationary seal member is mounted on a device carrying the shaft, and providing and mounting a rotatable seal member on the shaft. With the sealing assembly, kit and method for rotatable shafts, the invention provides a versatile and effective seal.

20 Claims, 6 Drawing Figures

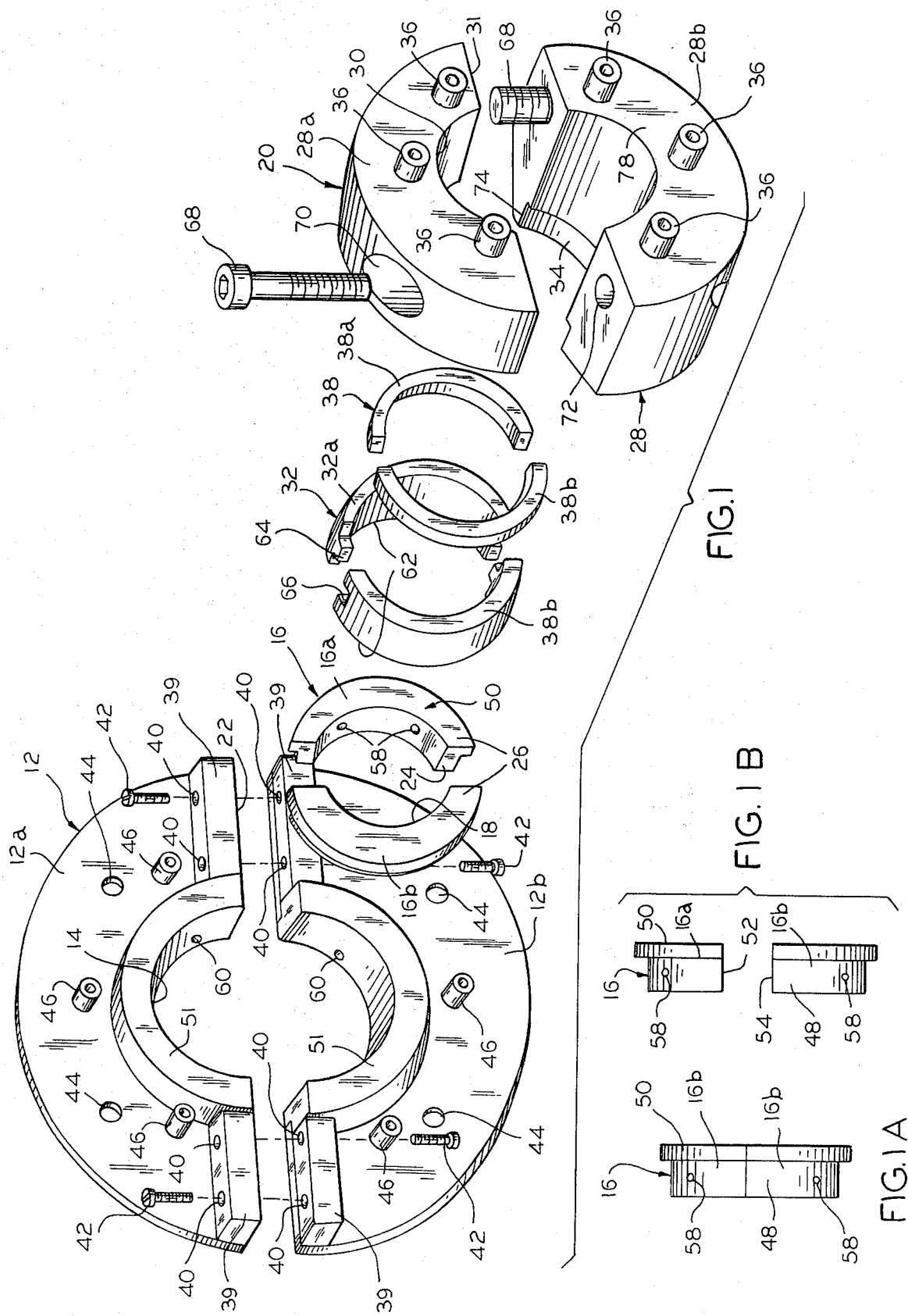

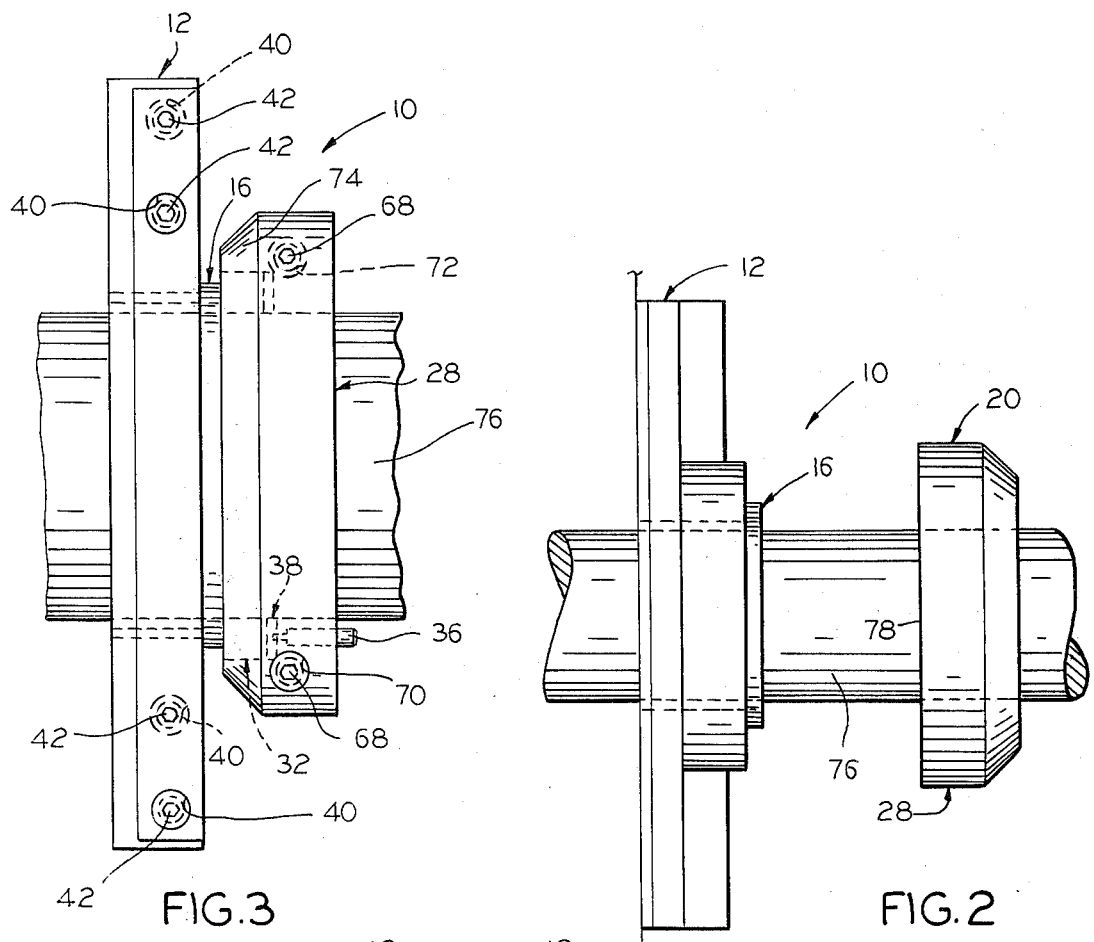
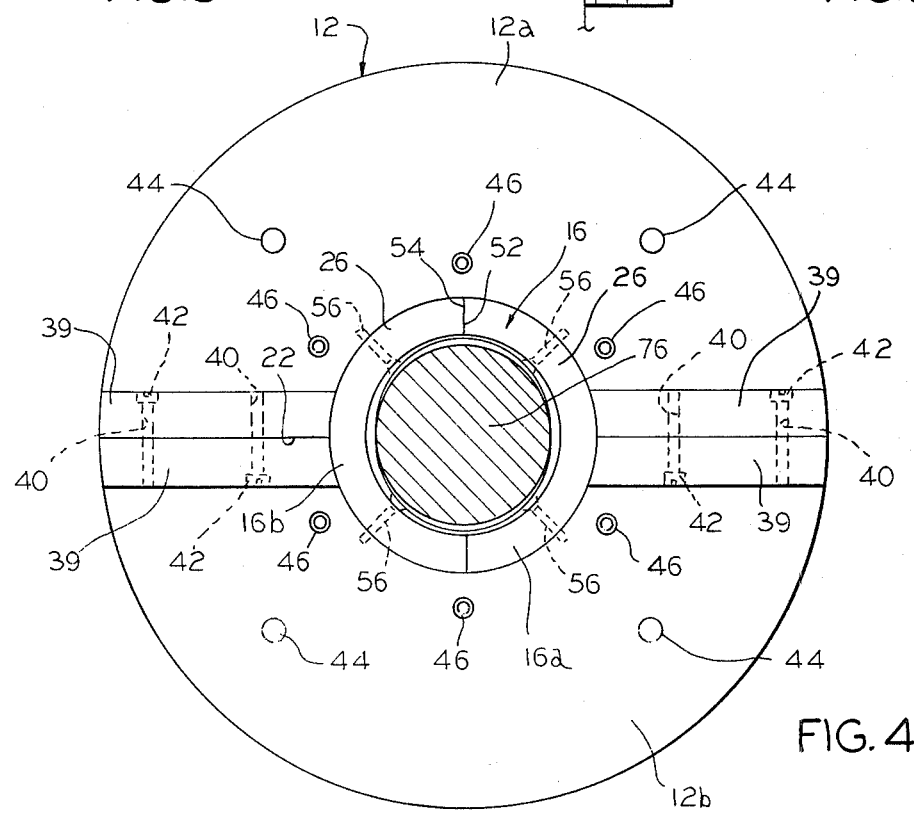

SEALING ASSEMBLY, KIT AND METHOD FOR ROTATABLE SHAFTS

BACKGROUND OF THE INVENTION

The present invention is generally related to shaft seals and, more particularly, to a sealing assembly, kit and method for rotatable shafts. Specifically, the present invention is directed to effecting a sealing joint between relatively rotatable elements which include a stationary element and a rotatable shaft passing through the stationary element.

In various types of machinery, it is continuously a problem to seal the opening through which a rotatable shaft protrudes. The problem is manifested in the difficulty of preventing leakage or loss of pressure or loss of vacuum while at the same time avoiding undue shaft friction. The shaft friction can generate heat, cause loss of power, and even damage the machinery. One method of effecting a seal at a joint between a stationary element and a rotatable shaft has been through the use of packing, stuffing, or the like. However, packing or stuffing causes considerable friction on the shaft. Another method of effecting a seal has been to utilize O-rings. However, O-rings have presented a problem due to the difficulty of providing a proper material to accommodate the wear thereon when utilized with shafts that operate at high speed. The shaft seals have also for the most part required the machinery to be stripped or dismantled for replacement purposes. The necessity for stripping or dismantling the machinery is most undesirable particularly where the machinery being sealed is large and heavy. Moreover, in order to replace conventional mechanical seals, the machinery must oftentimes be shut down for prolonged periods of time resulting in enormous losses in productivity.

As a result, it has been recognized as desirable to provide the parts of a mechanical seal which are subject to wear in split fashion so that they can be easily mounted and later disassembled for repair or replacement purposes. This was successfully accomplished in my earlier U.S. Pat. No. 4,215,870 issued on Aug. 5, 1980, and seals manufactured according to my patent have been installed and have proven to be highly effective not only in terms of their sealing capabilities but also in terms of their drastic reduction in down time of expensive machinery used in costly processes. With the features of the invention of my earlier patent, a split-type seal has been provided which can be easily assembled and disassembled relative to machinery without interfering with the positioning or mounting of the stationary element and the rotatable shaft associated with it.

With attempts prior to my earlier U.S. Pat. No. 4,215,870 to provide a split-type seal, it had been a problem to maintain a complete seal at all times completely about the rotatable shaft. During operation, the seals could easily become worn or deteriorated and the wear and deterioration could be non-uniform circumferentially about the shaft because of a number of reasons such as misalignment of the shaft with respect to the machinery with which it is used, or due to other factors. However, I was able to provide a sealing assembly which overcame the problem of non-uniform wearing or deterioration of the seal parts.

Later I became aware of still additional problems requiring a solution. For instance, sealing assemblies are oftentimes needed in emergency situations. This is particularly true in applications which advantageously utilize the rotatable shaft seal disclosed and claimed in my earlier U.S. Pat. No. 4,215,870 where a seal is quickly needed on machinery used, for instance, in dangerous manufacturing processes such as the grinding of caustic chemicals and the like where time is of the essence and the seal must be made available in the field on extremely short notice. However, the shafts of such machinery vary significantly in size. Since time is of the essence in these applications, and it is not feasible to custom order a split seal from the manufacturer, field service personnel have been required to stock a large variety of seals in order to be able to service a customer on a timely basis.

The present invention is directed to solving the above and other problems while providing a seal as effective and versatile as that described in my earlier U.S. Pat. No. 4,215,870.

SUMMARY OF THE INVENTION

Accordingly, it is a principal object of the present invention to provide a sealing assembly, kit and method for rotatable shafts and, more particularly, an assembly, kit and method for effecting a sealing joint between relatively rotatable elements including a rotatable shaft passing through a stationary element.

In the exemplary embodiment, a sealing assembly for a device having a rotatable shaft is provided. The assembly contemplates stationary seal means for the device having an insert-receiving opening therein. The stationary seal means is adapted to be mounted on the device with the rotatable shaft extending through the insert-receiving opening. The insert-receiving opening is dimensioned so as to be larger than the rotatable shaft. The assembly also includes insert means for the stationary seal means having a shaft-receiving opening therein. The insert means is adapted to be mounted in the insert-receiving opening in the stationary seal means with the rotatable shaft extending through the shaft-receiving opening. The shaft-receiving opening initially is dimensioned so as to be smaller than the rotatable shaft. The sealing assembly further contemplates the shaft-receiving opening in the insert means being adapted to be enlarged before use. The opening can be enlarged so as to generally conform to the rotatable shaft before the stationary seal means is mounted on the device. The stationary seal means can then be mounted on the device with the rotatable shaft extending through the shaft-receiving opening in the insert means. Finally, the assembly includes rotatable seal means adapted to be mounted on the rotatable shaft to engage and cooperate with the insert means to establish a seal therebetween.

In the exemplary embodiment of the kit, a sealing assembly kit for devices having rotatable shafts of different dimensions is provided. The kit contemplates a plurality of stationary seal means for the devices having insert-receiving openings of different dimensions therein. The stationary seal means are again adapted to be mounted on the devices with the rotatable shafts extending through the insert-receiving openings. A particular stationary seal means is available for selection for use with a particular device such that the insert-receiving opening therein is dimensioned so as to be larger than the rotatable shaft of the particular device. The kit also includes a plurality of insert means for the stationary seal means having shaft-receiving openings therein. The insert means are adapted to be mounted in the insert-receiving openings in the stationary seal means. A particular insert means is available for selection for use with a particular stationary seal means such that the shaft-receiving opening therein is initially dimensioned so as to be smaller than the rotatable shaft of the particular device. The kit further contemplates the particular insert means selected for the particular device being such that the shaft-receiving opening therein is adapted to be enlarged before use. The opening can be enlarged so as to generally conform to the rotatable shaft of the particular device before the particular stationary seal means is mounted on the particular device. The stationary seal means can then be mounted with the rotatable shaft extending through the shaft-receiving opening in the particular insert means. Finally, the kit includes a plurality of rotatable seal means for the devices having shaft-receiving openings of different dimensions therein. The rotatable seal means are adapted to be mounted on the rotatable shafts to engage and cooperate with respective ones of the insert means. A particular rotatable seal means is available for selection for use with the particular insert means such that the shaft-receiving opening therein generally conforms to the rotatable shaft of the particular device.

In the exemplary embodiment of the method, a method of effecting a seal for a device having a rotatable shaft is disclosed. The method includes the step of providing stationary seal means for the device having an insert-receiving opening therein. The insert-receiving opening is dimensioned so as to be larger than the rotatable shaft. Insert means is provided for the stationary seal means having a shaft-receiving opening therein. The shaft-receiving opening initially is dimensioned so as to be smaller than the rotatable shaft. The method further includes the steps of mounting the insert means in the insert-receiving opening in the stationary seal means and enlarging the shaft-receiving opening in the insert means to generally conform to the rotatable shaft after which the stationary seal means is mounted on the device with a rotatable shaft extending through the shaft-receiving opening in the insert means. Rotatable seal means is provided for the rotatable shaft having a shaft-receiving opening therein. The rotatable seal means is dimensioned so as to generally conform to the rotatable shaft. Finally, the method includes the step of mounting the rotatable seal means on the rotatable shaft to engage and cooperate with the insert means to establish a seal therebetween.

BRIEF DESCRIPTION OF THE DRAWINGS

In the drawings:

FIG. 1 is an exploded perspective view of the sealing assembly of the present invention;

FIG. 1A is a side elevational view of the insert portion of the sealing assembly of FIG. 1;

FIG. 1B is an exploded side elevational view of the insert portion of the sealing assembly of FIG. 1;

FIG. 2 is a side elevational view of the sealing assembly of FIG. 1 during an intermediate step of assembly;

FIG. 3 is a side elevational view of the sealing assembly of FIG. 1 after completing assembly; and FIG. 4 is a front elevational view of the stationary seal portion of the sealing assembly mounted in place on a rotatable shaft in accordance with the present invention.

DETAILED DESCRIPTION OF THE PREFERRED EMBODIMENT

Referring to the drawings, and first to FIG. 1, the reference numeral 10 designates generally a sealing assembly for a device having a rotatable shaft in accordance with the present invention. The sealing assembly 10 includes stationary seal means 12 for the device having an insert-receiving opening 14 therein. The stationary seal means 12 is adapted to be mounted on the device with the rotatable shaft extending through the insert-receiving opening. The insert-receiving opening 14 is dimensioned so as to be larger than the rotatable shaft.

The sealing assembly 10 also includes insert means 16 for the stationary seal means 12 having a shaft-receiving opening 18 therein. The insert means 16 is adapted to be mounted in the insert-receiving opening 14 in the stationary seal means 12 with a rotatable shaft extending through the shaft-receiving opening 18. The shaft-receiving opening 18 initially is dimensioned so as to be smaller than the rotatable shaft.

The sealing assembly 10 also contemplates the shaft-receiving opening 18 in the insert means 16 being adapted to be enlarged before use. The shaft-receiving opening 18 can be enlarged so as to generally conform to the rotatable shaft before the stationary seal means 12 is mounted on the device. The stationary seal means 12 can then be mounted on the device with the rotatable shaft extending through the shaft-receiving opening 18 in the insert means 16.

The sealing assembly 10 still further includes rotatable seal means 20 adapted to be mounted on the rotatable shaft to engage and cooperate with the insert means 16 to establish a seal therebetween. The rotatable seal means 20 is advantageously of the same or a similar structure as that described in my earlier U.S. Pat. No. 4,125,870 issued on Aug. 5, 1980, which is for this purpose incorporated herein by reference. However, the sealing assembly 10 can optionally be provided with rotatable seal means differing structurally from that disclosed in my earlier patent.

Still referring to FIG. 1, the stationary seal means 12 comprises a support plate split through the insert-receiving opening 14 (as indicated at 22) to define two substantially identical plate portions 12a and 12b. The insert-receiving opening 14 is generally circular in shape and the insert means 16, which comprises a projecting collar, i.e., a collar which projects from the support plate 12, is split through the shaft-receiving opening 18 (as indicated at 24) to define two substantially identical collar portions 16a and 16b which, when assembled, form a generally circular shaped shaft-receiving opening 18. Also as shown, the projecting collar 16 includes an annular sealing surface 26 adapted to lie in a plane generally perpendicular to a rotatable shaft, the rotatable seal means 20 being adapted to engage and cooperate with the annular sealing surface 26.

In practice, the sealing assembly 10 is adapted for use with a rotatable shaft that is circular in cross-section. It has been found advantageous for the shaft-receiving opening 18 in the projecting collar 16 to be slightly out of round with a major dimension and a minor dimension differing from one another by no more than approximately five percent (5%). By so doing, it has been found that the sealing assembly 10 has a prolonged useful life, as will be discussed below.

Still referring to FIG. 1, the rotatable seal means 20 includes a rotatable collar 28 having a shaft-receiving opening 30. The rotatable collar 28 is split through the shaft-receiving opening 30 (as indicated at 31), and the shaft-receiving opening is generally circular in shape for use with rotatable shafts having a circular cross-section. The rotatable seal means 20 also includes a split ring seal 32 adapted to be placed about a rotatable shaft. The rotatable collar 28 has a recess 34 adapted to receive the split ring seal 32. Additionally, the rotatable collar preferably includes at least one spring member 36 for biasing against a split backing plate 38 which may be disposed in the recess 34 to bias the split ring seal 32 against the annular sealing surface 26 of the projecting collar 16.

In kit form, the sealing assembly may be provided for devices having rotatable shafts of different dimensions. It is then advantageous to provide a plurality of stationary seal means having insert-receiving openings of different dimensions. The stationary seal means are adapted to be mounted on the devices with the rotatable shafts extending through the insert-receiving openings. A particular stationary seal means will then be available for selection for use with a particular device such that the insert-receiving opening therein is dimensioned so as to be larger than the rotatable shaft of the particular device.

It is then also advantageous to provide a plurality of insert means for the stationary seal means having shaft-receiving openings of different dimesnions. The insert means are adapted to be mounted in the insert-receiving openings in the stationary seal means. A particular insert means is available for selection for use with a particular stationary seal means such that the shaft-receiving opening therein is initially dimensioned so as to be smaller than the rotatable shaft of the particular device with the particular insert means being selected for the particular device such that the shaft-receiving opening therein is adapted to be enlarged. The shaft-receiving opening can then be enlarged so as to generally conform to the rotatable shaft of the particular device. Specifically, the shaft-receiving opening can be enlarged by any conventional technique before the particular stationary seal means is mounted on the particular device with the rotatable shaft extending through the shaft-receiving opening in the particular insert means.

It is then further advantageous to provide a plurality of rotatable seal means having shaft-receiving openings of different dimensions. The rotatable seal means are adapted to be mounted on the rotatable shafts to engage and cooperate with respective ones of the insert means. A particular rotatable seal means is available for selection for use with a particular insert means such that the shaft-receiving opening therein generally conforms to the rotatable shaft of the particular device.

As will be appreciated, a significant advantage is achieved with the sealing assembly being adapted to be supplied in kit form. The advantage is manifested in the ability to provide a relatively small number of compatible stationary seal means, insert means, and rotatable seal means in terms of their relative size while being able to specifically adapt at least one set of such components to fit machinery and rotatable shafts thereof of nearly any size. Since the shaft-receiving opening 18 in the insert means 16 and the shaft-receiving opening 30 in the rotatable collar 28 can both be enlarged, it is possible in the field to machine these components within strict tolerances to conform to a particular rotatable shaft. The advantage is significant because it eliminates the attendant delays in precisely measuring the shaft, transmitting the order to the manufacturer, awaiting the processing of the order, awaiting the manufacture of a specific sealing assembly for the particular application, and experiencing the delays inherent in shipment. Even then, the specific sealing assembly may prove to be slightly missized in which case another sealing assembly may have to be ordered, with substantial further delays being encountered, depending upon whether the defective sealing assembly can be machined to correct the defect in the seal.

With the present invention, such problems have been totally eliminated. As a result, field service personnel can repair leaking machinery or equipment on site in a matter of a few hours or less by merely stocking a relatively few compatible sets of the sealing assembly kit in a range of sizes normally required for their customers. Moreover, the manufacturer of the kits is also able to effect substantial savings.

In particular, the manufacturer may run his plant much more efficiently. The manufacturer may run the various sizes of components that make up the kits during times of reduced production of other products thereby maintaining a steady work force in a productive capacity without the need for layoffs or outlays for non-producing employees. With this type operation, the manufacturer may maintain a good supply of all components in all sizes in anticipation of replacement stock orders from field service personnel.

Referring to FIG. 1 in greater detail, the support plate 12 includes a pair of brackets welded or machined on the confronting edges of the plate portions 12a and 12b. The brackets 39, which are located on opposite sides of the insert-receiving opening 14 are provided for securing the split halves of the support plate 12 together for which purpose the brackets 39 include mating sets of holes 40 adapted to threadingly receive shoulder bolts 42, the shank receiving holes being tapped and reamed for precise alignment. As shown in FIG. 1, the mating sets of holes 40 may be arranged such that every other shoulder bolt 42 is inserted from the opposite direction.

Also as shown in FIG. 1, the plate portions 12a and 12b each include a pair of holes 44 adapted to receive bolts for securing the support plate 12 to machinery being fitted with the sealing assembly 10. It will further be seen that the plate portions 12a and 12b each include a plurality of bolts or screws 46 carried by the plate portions 12a and 12b about the periphery of the insert-receiving opening 14 for aligning the annular sealing face 26 of the insert means 16 so as to lie in a plane generally perpendicular to the rotatable shaft about which the sealing assembly 10 is applied. With this arrangement, the bolts provided to extend through the holes 44 may be loosely secured, then the bolts or screws 46 may be used to align the annular sealing face 26 in a plane lying perpendicular to the rotatable shaft, after which the bolts provided to extend through the holes 44 may be tightened.

Referring now to FIGS. 1a and 1b, the insert means 16 includes an annular collar 48 having an outer dimension substantially equal to the inner dimension of the insert-receiving opening 14. It will also be seen that the insert means 16 includes an annular flange or head 50 adapted to lie on the annular surface 51 of the support plate 12 immediately surrounding the insert-receiving opening 14 which, as shown, is the surface of a collar-like projection. The outwardly facing surface of the flange or head 50 comprises the annular sealing surface 26. It will also be seen that it is advantageous to provide opposing ends of each of the insert portions 16a and 16b with smooth surfaces 52 and 54 ground to permit them to be secured together in sealed relation to form the insert means 16. With this arrangement, the insert 16 is relatively inexpensive to manufacture by reason of the utilization of a pair of identical insert portions.

When the insert means 16 has been formed, it can be placed within the insert-receiving opening 14 of an assembled support plate 12. It is then advantageous to secure the insert means 16 in position by utilizing pins 56 (see FIG. 4) which may be driven through countersunk holes 58 in the inner surface of the collar 48 into mating holes 60 in the inner surface of the insert-receiving opening 14. If desired, the holes 58 can be bored to receive pins 56 having tapered heads as shown in FIG. 4.

Referring once again to FIG. 1, the rotatable seal means 32, which is in the form of a circular sealing ring, has an annular planar sealing surface 62 for engaging and cooperating with the annular planar sealing surface 26 of the insert means 16 for effecting a seal therebetween. It will be seen that the sealing ring 32 is split to include two ring portions 32a and 32b with the ring portions being adapted to be mated by means of a tongue-and-grove construction which includes a tongue 64 on one end of each of the ring portions and a groove 66 on the other end thereof. By way of example and not limitation, the circular sealing ring 32 may be fabricated of Teflon, carbide, or other suitable sealing materials.

Also as shown, the backing plate 38 is split to include two substantially identical plate portions 38a and 38b. It will be appreciated that the ring portions 32a and 32b (which are also substantially identical) and the plate portions 38a and 38b are adapted to fit about a rotatable shaft without dismantling the machinery accounting for the fact that the circular sealing ring 32 and the backing plate 38 are split. Similarly, the rotatable collar 28 is split to include two substantially identical collar portions 28a and 28b.

Referring specifically to the collar 28, the collar portions 28a and 28b are mated together and secured about a rotatable shaft for rotation therewith by means of a pair of threaded bolts 68. It will be seen that one of the bolts 68 passes through a countersunk bore 70 in each of the collar halves 28a and 28b to be threaded into a mating bore 72 in the other of the collar portions 28a and 28b, the mating bores 72 having been tapped and reamed for precise alignment. By selecting and/or maching the proper size shaft-receiving opening 30, the rotatable collar 28 rotates with a shaft by means of a friction fit between the shaft and the shaft-receiving opening 30.

As will be appreciated, the circular sealing ring 32 and the backing plate 38 are positioned axially of and concentric with the shaft by means of a flange 74 protruding axially of and concentric with the shaft-receiving opening 30 a distance sufficient to receive the circular sealing ring 32 and the backing plate 38. It will be appreciated that the recess 34 is defined by the flange 74 and the circular sealing ring 32 and the backing plate 38 are adapted to fit within the recess. Finally, the rotatable collar 28 may advantageously be provided with a plurality of spring members 36 in the form of adjustable spring assemblies disposed about the periphery of the shaft-receiving opening 30 for urging the circular sealing ring 32 and the backing plate 38 axially toward the annular sealing face 26 of the insert 16.

By utilizing the unique sealing assembly of the present invention, a method of effecting a seal for a device having a rotatable shaft in an advantageous manner has been provided. The method includes the step of providing stationary seal means 12 for the device having an insert-receiving opening 14 therein dimensioned so as to be larger than the rotatable shaft. Insert means 16 is then provided for the stationary seal means 12 having a shaft-receiving opening 18 therein initially dimensioned so as to be smaller than the rotatable shaft. The insert means 16 is then mounted in the insert-receiving opening in the stationary seal means 12 and enlarged to generally conform to the rotatable shaft after which the stationary seal means 12 is mounted on the device with the rotatable shaft extending through the shaft-receiving opening in the insert means 16. Rotatable seal means 20 is then provided for the rotatable shaft having a shaft-receiving opening 30 therein dimensioned so as to generally conform to the rotatable shaft. The method still further includes the step of mounting the rotatable seal means 20 on the rotatable shaft to engage and cooperate with the insert means 16 to establish a seal therebetween.

In kit form, the method of manufacturing sealing assembly kits for devices having rotatable shafts of different dimensions is entirely unique. The method includes the step of providing a plurality of stationary seal means for the devices having insert-receiving openings of different dimensions therein. A particular stationary seal means is then selected having an insert-receiving opening therein for use with a particular device where the insert-receiving opening is dimensioned so as to be larger than the rotatable shaft of the particular device. The method next includes the step of providing a plurality of insert means for the stationary seal means having shaft-receiving openings of different dimensions therein. A particular insert means is then selected having a shaft-receiving opening therein for use with the particular stationary seal means where the shaft-receiving opening is dimensioned so as to be smaller than the rotatable shaft of the particular device, and the particular insert means is then mounted in the insert-receiving opening in the particular stationary seal means and the shaft-receiving opening in the particular insert means is enlarged to generally conform to the rotatable shaft of the particular device. The method next includes the step of providing a plurality of rotatable seal means for the devices having shaft-receiving openings of different dimensions therein. A particular rotatable seal means is then selected having a shaft-receiving opening therein for use with the particular insert means with the shaft-receiving opening being dimensioned so as to generally conform to the rotatable shaft of the particular device.

Whether in kit form or individually, the sealing assembly and method of the present invention, represent a significant advancement. It is now possible for the first time, not only to provide a highly effective and economical split-type rotatable shaft seal, but also to do so in a fashion which permits maximum versatility and servicing of customers in emergency situations on a timely basis which could otherwise cause costly damage and/or down time in a wide variety of manufacturing processes. By eliminating these problems, the present invention has accomplished what those skilled in the art have thought impossible heretofore.

As previously mentioned, the shaft-receiving opening 18 in the insert 16 is preferably slightly out of round. This is shown in FIG. 4 (the rotatable shaft being designated 76) and the reason for doing this is that the circular sealing ring 32 has been demonstrated to last longer by reason of the fact that fluid flowing between the shaft-receiving opening 18 and the rotatable shaft 76 is kept from hitting the circular sealing ring 32 in a single location but, rather, uniformly contacts the circular sealing ring 32 to produce lubrication and even wear. While the phenomenon producing this result is not fully understood, it is believed to occur either because of the shaft creating turbulent fluid flow or creating helical vortex flow resulting in an automatic cleaning of the circular sealing ring 32.

One further aspect of the present invention is worthy of mention. It has been found that the back face 78 of the rotatable collar 28 (with the adjustable spring assemblies 36 removed) can be used to properly install the support plate 12 with the annular sealing face 26 of the insert means 16 oriented to lie in a plane perpendicular to the rotatable shaft. In other words, the rotatable collar 28 acts as an installation accessory in addition to being a component of the rotatable seal means 20.

Referring specifically to FIG. 2, the collar portions 28a and 28b can be placed around the shaft backwards with the face 78 toward the annular sealing surface 26 with the bolts 68 loosely securing the collar portions 28a and 28b together. The rotatable collar 28 can then be slowly pushed toward the annular sealing surface 26 until it is approximately ⅛ inch from the annular sealing surface at which point it is desirable to snug up the bolts 68. The gap between the face 78 and the annular sealing surface 26 is then inspected from every angle possible to determine whether they are close to parallel. If so, nothing further need be done, but otherwise the aligning bolts or screws 46 are used to adjust the stationary seal means until the annular sealing surface 26 and the face 78 appear to be parallel.

After this has been done, the bolts 68 are again loosened so as to be able to slowly push the rotatable collar 28 up to make contact with the annular sealing surface 26. A feeler gauge is then used by placing it between the face 78 and the surface 26 after which the bolts 68 are gently snugged up until the rotatable collar 28 is tight on the shaft. At this point, the feeler gauge is moved around between the face 78 and the annular sealing surface 26 to check the tolerance approximately every 120° to be sure that the gap between them is approximately 0.001 inch to 0.002 inches, and adjustments are made using the aligning bolts or screws 46 until this is achieved, after which the bolts which are provided to extend through the openings 44 to secure the support plate 12 to the machinery are tightened.

When this has been done, the gap between face 78 and the annular sealing surface 26 is rechecked to make sure the tolerance has not changed. If it has, readjustments can be made until the tolerance is achieved. By proceeding in this fashion, it is possible to virtually assure that the annular sealing surface is disposed in a plane lying perpendicular to the rotatable shaft, as desired.

Of course, this is accomplished by accurately boring the shaft-receiving opening 30 in the rotatable collar 28 perpendicular to the face 78. It is also important, if the aligning technique described is to be used, to machine the face 78 so as to be perfectly smooth. However, due to the advantages inherent is being able to provide a double use for the rotatable collar 28, this additional machining step is well worth taking.

While in the foregoing specification a detailed description of the invention has been set forth for purposes of illustration, it will be appreciated by those skilled in the art that the details herein given may be varied without departing from the spirit and scope of the invention.

I claim:

1. A sealing assembly for a device having a rotatable shaft, comprising:

stationary seal means for said device having an insert-receiving opening therein, said stationary seal means being adapted to be mounted on said device with said rotatable shaft extending through said insert-receiving opening, said insert-receiving opening being dimensioned so as to be larger than said rotatable shaft;

insert means for said stationary seal means having a shaft-receiving opening therein, said insert means being adapted to be mounted in said insert-receiving opening in said stationary seal means with said rotatable shaft extending through said shaft-receiving opening, said shaft-receiving opening initially being dimensioned so as to be smaller than said rotatable shaft;

said shaft-receiving opening in said insert means being adapted to be enlarged so as to generally conform to said rotatable shaft before said stationary seal means is mounted on said device with said rotatable shaft extending through said shaft-receiving opening in said insert means; and rotatable seal means adapted to be mounted on said rotatable shaft to engage and cooperate with said insert means to establish a seal therebetween.

2. The sealing assembly as defined in claim 1 wherein said stationary seal means comprises a support plate, said support plate being split through said insert-receiving opening, said insert-receiving opening being generally circular in shape.

3. The sealing assembly as defined in claim 1 wherein said insert means comprises a projecting collar, said projecting collar being split through said shaft-receiving opening, said shaft-receiving opening being generally circular in shape.

4. The sealing assembly as defined in claim 1 wherein said insert means includes an annular sealing surface, said annular sealing surface lying in a plane generally perpendicular to said rotatable shaft, said rotatable seal means engaging and cooperating with said annular sealing surface.

5. The sealing assembly as defined in claim 1 wherein said rotatable shaft is circular in cross-section, said shaft-receiving opening in said insert means being slightly out of round with a major dimension and a minor dimension, said major and minor dimensions differing by no more than approximately five percent (5%).

6. The sealing assembly as defined in claim 1 wherein said rotatable seal means includes a rotatable collar having a shaft-receiving opening, said rotatable collar being split through said shaft-receiving opening, said shaft-receiving opening being generally circular in shape.

7. The sealing assembly as defined in claim 6 wherein said rotatable seal means also includes a split ring seal adapted to be placed about said rotatable shaft, said rotatable collar having a recess to receive said split ring seal, and including at least one spring member associated with said rotatable collar for biasing said split ring seal against said insert means.

8. A method of manufacturing sealing assembly kits for devices having rotatable shafts of different dimensions, comprising the steps of:
providing a plurality of stationary seal means for said devices having insert-receiving openings of different dimensions therein;
selecting a particular stationary seal means having an insert-receiving opening therein for use with a particular device, said insert-receiving opening being dimensioned so as to be larger than said rotatable shaft of said particular device;
providing a plurality of insert means for said stationary seal means having shaft-receiving openings therein;
selecting a particular insert means having a shaft-receiving opening therein for use with said particular stationary seal means, said shaft-receiving opening being dimensioned so as to be smaller than said rotatable shaft of said particular device;
mounting said particular insert means in said insert-receiving opening in said particular stationary seal means;
enlarging said shaft-receiving opening in said particular insert means to generally conform to said rotatable shaft of said particular device;
providing a plurality of rotatable seal means for said devices having shaft-receiving openings of different dimensions therein; and
selecting a particular rotatable seal means having a shaft-receiving opening therein for use with said particular insert means, said shaft-receiving opening being dimensioned so as to generally conform to said rotatable shaft of said particular device.

9. A method of effecting a seal for a device having a rotatable shaft, comprising the steps of:
providing stationary seal means for said device having an insert-receiving opening therein, said insert-receiving opening being dimensioned so as to be larger than said rotatable shaft;
providing insert means for said stationary seal means having a shaft-receiving opening therein, said shaft-receiving opening initially being dimensioned so as to be smaller than said rotatable shaft;
mounting said insert means in said insert-receiving opening in said stationary seal means;
enlarging said shaft-receiving opening in said insert means to generally conform to said rotatable shaft;
mounting said stationary seal means on said device with said rotatable shaft extending through said shaft-receiving opening in said insert means;
providing rotatable seal means for said rotatable shaft having a shaft-receiving opening therein, said rotatable seal means being dimensioned so as to generally conform to said rotatable shaft; and
mounting said rotatable seal means on said rotatable shaft to engage and cooperate with said insert means to establish a seal therebetween.

10. The method as defined in claim 9 wherein said step of providing stationary seal means includes providing a support plate, said support plate comprising said stationary seal means and being split through said insert-receiving opening, said insert-receiving opening being generally circular in shape.

11. The method as defined in claim 9 wherein said step of providing insert means includes providing a projecting collar, said projecting collar comprising said insert means and being split through said shaft-receiving opening, said shaft-receiving opening being generally circular in shape.

12. The method as defined in claim 9 wherein said step of providing insert means includes providing an annular sealing surface, said annular sealing surface lying in a plane generally perpendicular to said rotatable shaft, said rotatable seal means engaging and cooperating with said annular sealing surface.

13. The method as defined in claim 9 wherein said rotatable shaft is circular in cross-section, said step of enlarging said shaft-receiving opening in said insert means including enlargement of said shaft-receiving opening to be slightly out of round with a major dimension and a minor dimension, said major and minor dimensions differing by no more than approximately five percent (5%).

14. The method as defined in claim 9 wherein the step of providing rotatable seal means includes providing a rotatable collar having a shaft-receiving opening, said rotatable collar being split through said shaft-receiving opening, said shaft-receiving opening being generally circular in shape.

15. The method as defined in claim 14 wherein said step of providing rotatable seal means also includes providing a split ring seal adapted to be placed about said rotatable shaft, said rotatable collar having a recess to receive said split ring seal, and providing at least one spring member associated with said rotatable collar for biasing said split ring seal against said insert means.

16. A sealing assembly kit for devices having rotatable shafts of different dimensions, comprising:
a plurality of stationary seal means for said devices having insert-receiving openings of different dimensions therein, said stationary seal means being adapted to be mounted on said devices with said rotatable shafts extending through said insert-receiving openings, a particular stationary seal means being available for selection for use with a particular device such that said insert-receiving opening therein is dimensioned so as to be larger than said rotatable shaft of said particular device;
a plurality of insert means for said stationary seal means having shaft-receiving openings of different dimensions therein, said insert means being adapted to be mounted in said insert-receiving openings in said stationary seal means, a particular insert means being available for selection for use with a particular stationary seal means such that said shaft-receiving opening therein is initially dimensioned so as to be smaller than said rotatable shaft of said particular device;
said particular insert means selected for said particular device being such that said shaft-receiving opening therein is adapted to be enlarged so as to generally conform to said rotatable shaft of said particular device before said particular stationary seal means is mounted on said particular device with said rotatable shaft extending through said shaft-receiving opening in said particular insert means; and
a plurality of rotatable seal means for said devices having shaft-receiving openings of different dimensions therein, said rotatable seal means being adapted to be mounted on said rotatable shafts to engage and cooperate with respective ones of said insert means, a particular rotatable seal means being available for selection for use with a particular insert means such that said shaft-receiving opening therein generally conforms to said rotatable shaft of said particular device.

17. A method of aligning a sealing surface of a sealing member in a preselected plane in relation to a rotatable shaft, comprising:
providing said sealing member with means for adjusting the planar orientation of said sealing surface and means for securing said sealing surface in a planar orientation achieved with said adjusting means;
providing an aligning member adapted to be secured to said rotatable shaft, said aligning member having a reference surface lying in said preselected plane when said aligning member is secured to said rotatable shaft, said aligning member including means for securing said reference surface in said preselected plane;
securing said aligning member to said rotatable shaft in closely spaced relation to said sealing member with said reference surface in confronting relation to said sealing surface;
adjusting the planar orientation of said sealing surface of said sealing member with said adjusting means to lie in a plane lying generally parallel to the plane of said reference surface of said aligning member;
securing said aligning member to said rotatable shaft adjacent to said sealing member with said reference surface in contact with said sealing surface;
measuring the distance between said reference surface of said aligning member and said sealing surface of said sealing member at a plurality of points about the periphery thereof;
adjusting the planar orientation of said sealing surface of said sealing member with said adjusting means until said reference surface of said aligning member and said sealing surface of said sealing member are spaced equidistant substantially entirely about the periphery thereof; and
securing said sealing surface of said sealing member in said planar orientation achieved with said adjusting means by utilizing said securing means;
whereby said sealing surface of said sealing member may be aligned in said preselected plane.

18. The method as defined in claim 17 wherein said sealing member is a stationary sealing plate having a shaft-receiving opening therein, said stationary sealing plate having a plurality of aligning bolts about the periphery of said shaft-receiving opening, said aligning bolts comprising said adjusting means.

19. The method as defined in claim 17 wherein said aligning member is a rotatable sealing assembly having a shaft-receiving opening therein, said rotatable sealing assembly having a sealing surface opposite said reference surface, said rotatable sealing assembly being reversible on said rotatable shaft for engagement of said sealing surfaces after adjustment of said sealing member.

20. The method as defined in claim 17 wherein said preselected plane is a plane lying perpendicular to said rotatable shaft, said shaft-receiving opening in said aligning member being generally circular in cross-section and being perpendicular to said reference surface, said sealing member also having a shaft-receiving opening generally circular in cross-section, said rotatable shaft being circular in cross-section.

* * * * *